US012453537B2

(12) United States Patent
Wang

(10) Patent No.: US 12,453,537 B2
(45) Date of Patent: Oct. 28, 2025

(54) CLOSESTOOL TYPE URINE AND EXCREMENT DETECTION ROBOT AND INTERNET-OF-THINGS SYSTEM

(71) Applicant: Xiamen Brana Design Co., Ltd., Xiamen (CN)

(72) Inventor: Zhongtang Wang, Xiamen (CN)

(*) Notice: Subject to any disclaimer, the term of this patent is extended or adjusted under 35 U.S.C. 154(b) by 304 days.

(21) Appl. No.: 17/909,435

(22) PCT Filed: Mar. 5, 2020

(86) PCT No.: PCT/CN2020/077883
§ 371 (c)(1),
(2) Date: Sep. 5, 2022

(87) PCT Pub. No.: WO2021/174474
PCT Pub. Date: Sep. 10, 2021

(65) Prior Publication Data
US 2023/0129932 A1    Apr. 27, 2023

(51) Int. Cl.
*A61B 10/00*    (2006.01)
*E03D 5/01*    (2006.01)
(Continued)

(52) U.S. Cl.
CPC ........ *A61B 10/0038* (2013.01); *A61B 10/007* (2013.01); *E03D 5/01* (2013.01);
(Continued)

(58) Field of Classification Search
CPC .................................................. A61B 10/0041
See application file for complete search history.

(56) References Cited

U.S. PATENT DOCUMENTS

2021/0071401 A1* 3/2021 Shen ..................... G06F 18/214

FOREIGN PATENT DOCUMENTS

CN    110108891 A  *  8/2019   ....... G01N 35/00722

* cited by examiner

Primary Examiner — Christine J Skubinna
(74) Attorney, Agent, or Firm — Raymond Y Chan; David & Raymond Patent Firm

(57) ABSTRACT

A closestool type urine and excrement detection robot and an Internet-of-Things system thereof. The closestool type urine and excrement detection robot comprises: an intelligent moving module (15), an interaction system module (32), a height adjustment module (19), a user identity identification module (28), a closestool structure module (13), a urine gross recognition detection module (11), an odor detection module (25, 33), a urine component detection module (51), an excrement gross recognition detection module (14), an excrement component detection module (108), a cleaning flushing module, a waste treatment module (21), a wireless communication module (30), a central data processing module (24), a data security module, a battery and charging module (20), and a device maintenance module. The urine and excrement detection robot can automatically reach a preset position, provide urination and defecation behavioral monitoring and urine and excrement component detection for a user, and screen urinary and digestive system diseases as soon as possible; device maintenance, data processing, and medical support are provided by means of an Internet of Things system, and the Internet of Things system can also be used in cooperation with a squatting pan or a pedestal pan of the user; a closestool structure is customized according to the individuation of the user, and therefore, efficient, convenient and intelligent urine and excrement detection experience is provided for the user.

15 Claims, 8 Drawing Sheets

(51) Int. Cl.
*E03D 7/00* (2006.01)
*E03D 11/11* (2006.01)
*G01N 33/483* (2006.01)
*G05D 1/00* (2024.01)
(52) U.S. Cl.
CPC ................ *E03D 7/00* (2013.01); *E03D 11/11* (2013.01); *G01N 33/483* (2013.01); *G05D 1/0214* (2013.01)

CLOSESTOOL TYPE URINE AND EXCREMENT DETECTION ROBOT AND INTERNET-OF-THINGS SYSTEM

BACKGROUND OF THE PRESENT INVENTION

Field of Invention

The present invention relates to a field of in vitro medical detection, and more particularly to a closestool type urine and excrement detection robot and an Internet of Things (IoT) system for the closestool type urine and excrement detection robot.

Description of Related Arts

At present, urodynamic examination can clarify a pathophysiological change of urinary dysfunction diseases by understanding a function and mechanism of urinary tract voiding. Routine urodynamic examination needs to go to a hospital special examination room, because it is an invasive examination. Anyone who has done urodynamic examination knows that not only an examination process is long, also he or she might experience an unbearable pain. In addition, stool color, shape, character, and defecation dynamics are an important part of an assessment of digestive system health. However, there is currently no effective and objective monitoring measures.

With a prolongation of human lifespan and a gradual increase in an incidence of tumors, early detection and early treatment is a key to obtain a good prognosis of tumors. Among them, urine and excrement examinations, because of simple and non-invasive characteristics, have become an important early warning indicator for early screening of urinary tract and digestive tract tumors, especially urine comes from blood, and some tumor markers in blood can also be detected in urine. However, urine and excrement are dirty and smelly, people are not willing to cooperate during a detection, which directly affects an effectiveness of urine and excrement detection for early tumor screening. Therefore, there is a strong need to improve existing medical equipment and techniques for urine and excrement detection.

SUMMARY OF THE PRESENT INVENTION

The present application provides a closestool type urine and excrement detection robot and an IoT system for the urine excrement detection robot, which can solve a defect of an existing urine and excrement detection technology, improve a convenience of urine and excrement detection, improve a user experience of using a product, realize an autonomous movement of a detection device, monitor a user urination and defecation behavior and dynamic characteristics, and detect a component of urine and excrement.

In order to solve the above technical problems, a preferred embodiment of the present invention can provide a closestool type urine and excrement detection robot. The closestool type urine and excrement detection robot comprises an intelligent moving module, an interactive module, a height adjustment module, a user identification module, a closestool structure module, a urine general identification detection module, an odor detection module, a urine component detection module, a excrement general identification detection module, a excrement component detection module, a cleaning flushing module, a waste treatment module, a wireless communication module, a central data processing module, a data security module, a battery charging module, and an equipment maintenance module.

The intelligent moving module can be a four-wheeled robot device arranged at the bottom of the closestool structure module configured to be an intelligent autonomous mobile carrier. The intelligent moving module can autonomously avoid obstacles, optimize moving routes, and arrive at a scheduled service location.

The interactive module can integrate a multi-channel interaction mode, which includes a voice, a touch screen, an eyesight, an expression, an iris, a palm print, a handwriting, a gait, a gesture, a lip reading, a human face, a DNA, and an idea. The interactive module can be configured to integrate with a mobile smart terminal, a smart wearable device, and an implanted sensing chip in body, and groupware above information to realize a human-machine interaction and a machine-machine interaction.

The height adjustment module comprises a base support device, a plurality of support plates, a plurality of first intelligent controllable screw lifting devices, and a plurality of outriggers.

The user identification module comprises a biometric identification module and a pairing device identification module. The biometric identification module comprises a face identification module, a fingerprint identification module, a voice identification module, a gait identification module, a DNA identification module, and an IC card identification module. The pairing device identification module comprises a pairing identification module of an intelligent terminal, a pairing identification module of an intelligent wearable device, and a pairing identification module implanted with an in vivo perception chip.

The closestool structure module can be arranged on an upper part of the intelligent moving module. The closestool structure module comprises a main body, a seat ring, a cover plate, a backrest, a shower device, a water tank, a water inlet pipe, and a drainage pipe. The main body comprises a urine pool at a front and a excrement pool at a middle and rear. A wall of the urine pool includes a scale line. The backrest can be provided with a screen, a deodorizer, the odor detection module, the wireless communication module, the central data processing module, the interactive module, the user identification module, and the data security module. The closestool structure module can include two types of closestools, squat closestool system and seat closestool system. The squat closestool system can be added a set of foot pedals on a basis of the closestool, the foot pedals can be arranged on both sides of the main body, which are adjusted by a second intelligent controllable lead screw lifting device, so that to realize a functional structure of a squatting closestool.

The urine general identification detection module comprises at least one light-emitting diode (LED) light for providing illumination, at least one camera for collecting urine image data. The camera can be provided with an anti-reflection film for blocking direct contact between the camera and urine. The urine general recognition detection module can collect image and video data without dead angle, and combine with image and video data analysis algorithm to obtain a single urination time course, a urination dynamics characteristic, and a urine volume, color and turbidity data.

The excrement general identification detection module comprises at least three LED lights for providing illumination, and at least three cameras for collecting excrement image data. The excrement general identification detection module can collect image and video data without dead angle, so as to combine the image and video data analysis algorithm to obtain a defecation time course, a defecation dynamics characteristic, a morphological change around the anus during defecation, and an excrement volume, shape, character, and color data.

The odor detection module comprises a urine gas path, a excrement gas path, and a plurality of gas detection sensors, a gas chromatograph, and an ionization deodorization device integrated in the urine gas path and the excrement gas path respectively. The odor detection module can continuously detect an odor component of urine and excrement through the urine gas path and the excrement gas path.

The urine component detection module comprises a urine sample guide pipe, a urine test paper detection chamber, a urine flow analysis detection chamber, and a urine gene detection chamber. The urine test paper detection chamber comprises a urine detection test paper storage box, a urine detection test paper transmission device, a temperature control device, a urine sample tank, a urine detection test paper image scanning camera, and a waste test paper storage box. The urine flow analysis detection chamber comprises a urine sample centrifugal concentration device, a urine sediment negative pressure sampling device, and a flow cytometry detection device. The gene detection chamber comprises a gene chip storage box, a gene chip transmission device, a sample preparation device, a detection kit, a reagent sample addition device, a temperature control device, a gene chip hybridization reaction device, a signal detection device, and a used gene chip storage box.

The excrement component detection module comprises an excrement container, an electronic weighing device, a connecting shaft, a motor, a mixing stirring device, a filter, an excrement filtrate storage tank, a second electromagnetic valve, an excrement filtrate drainage pipeline, an excrement filtrate test strip test chamber, a excrement filtrate gene detection chamber, a excrement filtrate flow analysis detection chamber, a water inlet pipe, and a first electromagnetic valve. The excrement filtrate test paper detection chamber comprises an excrement filtrate test paper storage box, an excrement filtrate test paper transmission device, a temperature control device, an excrement filtrate sample tank, and an excrement filtrate test paper scanning device. The excrement filtrate flow analysis detection chamber can include an excrement filtrate drainage pipeline and a flow cytometry detection device.

The cleaning flushing system module comprises a water inlet pipeline, a pump, a third electromagnetic valve, a pipeline connecting the urine pool, a pipeline connecting the excrement pool, a pipeline connecting the urine component detection module, a pipeline connecting the excrement component detection module, and a drain pipe.

The waste treatment module comprises an odor treatment device, a used test paper storage box, and a used gene chip storage box.

The central data processing module comprises a data storage device and a data processing device. The data processing device can perform technical process on a collected data to compare a collected data with a normal reference value of population and a value detected by the user in past, and statistically analyze and combine the user living habits, family history of diseases, past disease history, symptoms, other inspection data of third-party intelligent medical systems and artificial medical systems to evaluate a health status of the user urinary system, digestive system and other systems, and provide a basis for medical decision-making. A technical process can include two schemes: (1) uploading data to a cloud server, providing calculation, analysis, and decision-making, publishing all data to a public chain, and sending it to the user at the same time; (2) applying localized data capabilities to provide calculation and analysis, decision-making, then all data are released to a private chain of a industry, and sent to the user via wireless or wired transmission.

The data security module can create a user data center through blockchain technology to store and distribute user data. A connection of the user data, IoT data, public cloud or private cloud is completely based on a blockchain smart contract authorized by the user, and the user data is written into a block in real time, and released to a public cloud or private cloud area with an authorization of the user to achieve secure isolation of user data, so that a third-party users can be authorized to read the data.

The equipment maintenance module comprises an equipment fault self-checking system, a fault self-repairing system, a fault information sending system, and a monitoring device for the remaining quantity of consumables.

As a preferred embodiment, the user identification module can perform a real-name authentication by a blockchain technology, signs a smart contract, create a personal private key and a personal public key. When the user inputs a biometric identification information, the blockchain network can pass a verification public key, then a key certificate chain verifies the user identity.

As a preferred embodiment, the camera can be provided with a video digital optical microscope with an intelligent focus adjustment, a polarized light source, and a fluorescent excitation light source, which are configured to obtain an image data of a parasites, egg, blood, and exfoliated tissue block in excrement.

As a preferred embodiment, the odor detection module can also share a set of gas detection sensors and a gas chromatograph in a process of urine gas detection and/or excrement gas detection. When the odor detection module performs detection, the urine gas path is first activated to detect urine odor components, and then the excrement gas path is activated to detect excrement odor components.

As a preferred embodiment, a testing object of the gene detection chamber can include a tumor cell DNA, a circulating tumor cell DNA, a circulating tumor cell RNA, a tumor cell exosome, and a protein marker, as well as a bacterial, fungal, and viral DNA and RNA.

As a preferred embodiment, the first electromagnetic valve can be configured to control the water inlet pipe for diluting excrement. According to a total volume and morphological data of excrement, an amount of water to be added can be determined through a preset algorithm. The preset algorithm can include: more excrement, more dilution water is added, drier and harder excrement, more diluted water is added, and thinner and softer excrement, less dilution water is added.

As a preferred embodiment, a shape of the closestool structure module can be customized according to a user need. The main body can be provided with a handrail structure.

As a preferred embodiment, at least one expansion slot can be reserved for both the urine component detection module and the excrement component detection module. The expansion slot can include an electric circuit, a water circuit, an air circuit, a sample transmission channel, a data interface, and a space.

As a preferred embodiment, the intelligent moving module can be a detachable structure, so that the closestool type urine and excrement detection robot can become a portable closestool urine excrement detection robot without the intelligent moving module.

As a preferred embodiment, the portable closestool urine excrement detection robot can be directly placed in a pool of a conventional closestool for urine and excrement detection.

As a preferred embodiment, the portable closestool urine excrement detection robot can also retain only the urine component detection module and the excrement component detection module to become a portable handheld device, which can be used combination with a conventional closestool to implement urine and excrement component detection.

As a preferred embodiment, the urine component detection module and the excrement component detection module can share the test paper detection chamber, the flow analysis detection chamber, and the gene detection chamber, so as to simplify and reduce a size of the portable handheld device.

The present invention also provides an IoT system for a closestool type urine and excrement detection robot. The IoT system for a closestool type urine and excrement detection robot can include at least one of a mobile intelligent terminal, a cloud server, an emergency management support system, a medical support system, a logistics system, an intelligent access control, and a nursing robot.

An application process of the closestool type urine and excrement detection robot can comprise a plurality of steps as follow.

(a) receiving requirements submitted by a user, including appointment time and length of use, service location, service items, and prepaid fees; (b) according to a planned route and delivery method, the closestool type urine and excrement detection robot arriving at a predetermined service location; (c) the closestool type urine and excrement detection robot connecting electrical circuits, water circuits, air circuits, networks; (d) the closestool type urine and excrement detection robot completing user identification; (e) the closestool type urine and excrement detection robot adjusting to an appropriate user height; (f) the closestool type urine and excrement detection robot receiving the user urination and defecation; (g) the closestool type urine and excrement detection robot collecting urination and defecation behavioral characteristics data; (h) the closestool type urine and excrement detection robot detecting urine; (i) the closestool type urine and excrement detection robot detecting general indicators of urine and excrement; (j) the closestool type urine and excrement detection robot detecting urine and excrement component indicators; (k) the closestool type urine and excrement detection robot completing detection; (1) the closestool type urine and excrement detection robot starting the flushing and disinfection; (m) ending a single detection; (n) the closestool type urine and excrement detection robot completing multiple tests as needed; (o) the closestool type urine and excrement detection robot sending encrypted data on urination and defecation behavioral characteristics, odor components, general indicators and component indicators to a cloud server; (p) the cloud server providing reports and health care suggestion to the use; and (q) the closestool type urine and excrement detection robot leaving the user for a next user based on demand.

As a preferred embodiment, the planned route and delivery method can include: (a) the closestool type urine and excrement detection robot goes to the user reservation location by itself, (b) the closestool type urine and excrement detection robot takes a vehicle, including but not limited to a car, a plane, a drone door-to-door service, a rail transit, and arrives at the user reservation location, (c) the closestool type urine and excrement detection robot is shipped by a third-party logistics system.

As a preferred embodiment, the closestool type urine and excrement detection robot can select and combine the odor detection module, the urine general recognition detection module, the urine component detection module, the excrement general identification detection module and the excrement component detection module to realize the user personalized detection requirements.

Based on the above solution, a beneficial effect of the embodiments of the present invention are: the closestool type urine and excrement detection robot can move autonomously, monitor the user urination and defecation behavior and dynamic characteristics, as well as the component of urine and excrement, so as to realize early screening of a urinary system and digestive system disease; IoT systems can provide equipment maintenance, data processing, and medical support.

Figure 1:
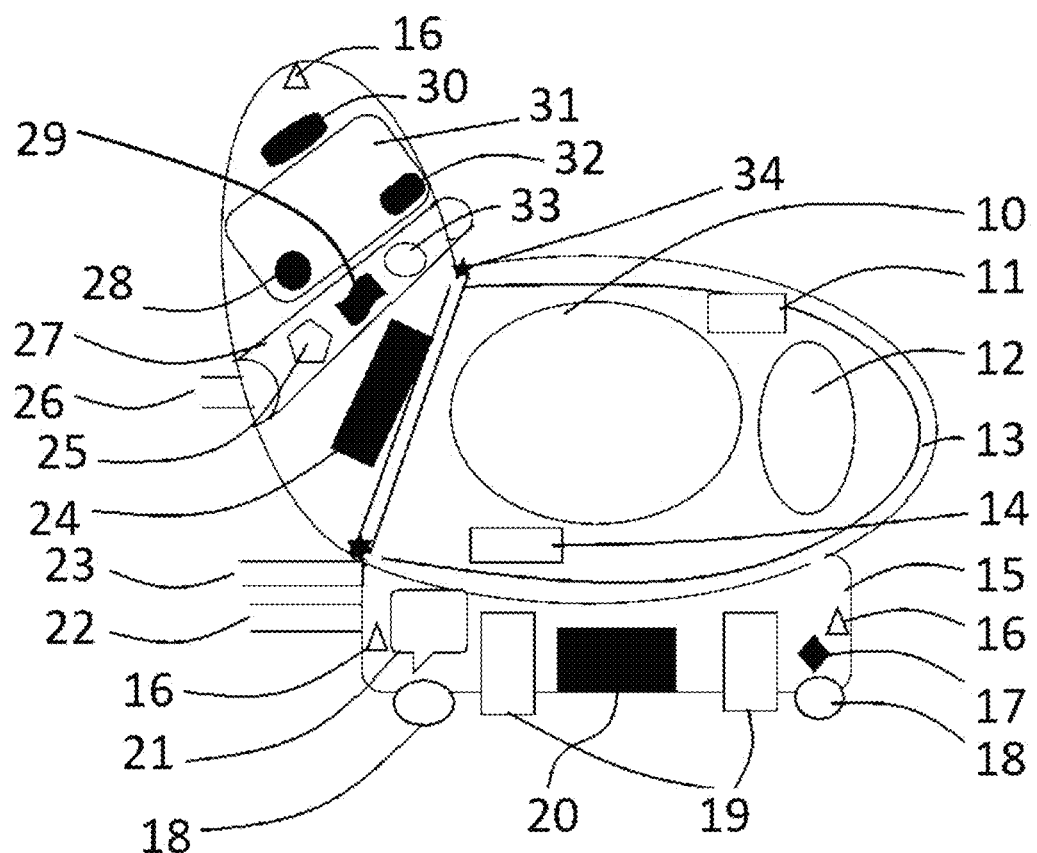
FIG. 1 is a schematic structural diagram of a closestool type urine and excrement detection robot according to a preferred embodiment of the present invention.

The reference signs in an accompanying drawing are as follow.

10, an excrement pool; 11, a urine general identification detection module; 12, a urine pool; 13, a closestool structure module; 14, an excrement general identification detection module; 15, an intelligent moving module; 16, a detector; 17, a GPS/Beidou navigation; 18, a driving wheel; 19, a height adjustment module;

20, a battery and charging module; 21, a waste treatment module; 22, a water inlet pipe; 23, a drainage pipe; 24, a central data processing module; 25, an excrement odor detection module; 26, an exhaust gas outlet; 27, a backrest; 28, a user identification module; 29, a deodorant device;

30, a wireless communication module; 31, a screen; 32, an interactive module; 33, an odor detection module; 34, a hinge; 35, a support plate; 38, an outrigger of a base screw device; 39, a left column of a screw device;

40, a main body; 41, a seat ring; 42, a shower device; 43, a water tank; 44, a left pedal; 45, a right pedal; 46, a second intelligent controllable screw lifting device; 47, a driving part; 48, a foot; 49, a support column;

50, a gas chromatograph; 51, a urine component detection module; 52, a urine test paper detection chamber; 53, a urine flow analysis detection chamber; 54, a gene detection chamber; 55, a centrifugal concentration device; 56, a pump; 57, a third solenoid valve; 58, a urine inlet; 59, a water inlet;

60, a waste liquid outlet; 61, a LED light of urine general recognition detection module; 62, a camera device of urine general recognition detection module; 63, a scale marking line of urine general recognition detection module; 64, an excrement general recognition detection module; 65, a camera device of an excrement general identification detection module; 66, a module shell structure; 67, a urine gas path; 68, a excrement gas path; 69, an ammonia sensor;

70, a hydrogen sulfide sensor; 71, a polycyclic aromatic hydrocarbon sensor; 72, a volatile organic compound sensor; 73, an exhaust gas outlet;

80, an image scanning device for urine detection test paper; 81, a liquid inlet of diversion pipe; 82, a temperature control device; 83, a urine sample tank; 84, a urine test paper; 85, a urine test paper storage box; 86, a urine detection chamber; 87, a new test paper; 88, a used test paper; 89, a used test paper storage box;

90, a liquid outlet of a diversion pipe; 91, a flow analysis instrument; 92, a liquid inlet of a diversion pipe of a urine flow analysis detection chamber; 93, a guide of a urine flow analysis detection chamber liquid outlet of flow pipeline; 94, a gene chip storage box; 95, a gene chip transmission device; 96, a sample preparation device; 97, a detection kit; 98, a gene chip hybridization reaction device; 99, a signal detection device;

100, a used gene chip storage box; 101, a new gene chip; 102, a chip in reaction; 103, a chip in detection; 105, a used chip; 106, a liquid inlet of gene detection chamber; 107, a liquid outlet of a gene detection chamber; 108, an excrement component detection module; 109, an excrement container;

110, a filter; 111, a stirring device; 112, an electronic weighing device; 113, a connecting shaft; 114, a motor; 115, a second solenoid valve; 116, an excrement filtrate storage tank; 117, a water inlet; 118, a waste liquid outlet; 119, a excrement filtrate test strip detection chamber; and 120, an excrement filtrate gene detection chamber; 121, an excrement filtrate flow analysis detection chamber; 122, a shower device; 123, a mobile intelligent terminal; 124, a cloud server; 125, an emergency management support system; 126, an intelligent access control; 127, a medical support system; 128, a logistics system; 129, a nursing robot.

DETAILED DESCRIPTION OF THE PREFERRED EMBODIMENT

A preferred embodiment of the present invention is clearly and completely described below with references to the accompanying drawings. Apparently, the preferred embodiment is only as examples of the present invention, and modifications will be apparent to those skilled in an art. A general principle defined in the following description would be applied to other embodiments, alternatives, modifications, equivalents, and applications without departing from a spirit and scope of the present invention.

By combining a urine and excrement detection device with a closestool, a problem of dirty and odor that occurs during urine and excrement detection can be solved. However, an inventor of the present invention has studied this and found that there are still deficiencies, including:

(1) urine and excrement examinations usually require more than three consecutive tests, which require multiple visits to a hospital, which is time-consuming and labor-intensive;

(2) a fixed setting of urine and excrement detection closestool in the hospital is not conducive to share, thereby reducing efficiency;

(3) when used at home, it is not compatible with an original family closestool; and (4) a fixed setting of urine and excrement detection closestool cannot move to the user side automatically, people with disabilities need an assistance of others to perform a detection.

As shown in FIGS. 1-11, a preferred embodiment of the present invention further provides a closestool type urine and excrement detection robot and an IoT system for the closestool type urine and excrement detection robot, which can realize an autonomous movement of inspection equipment, monitor a user urination and defecation behavioral and dynamic characteristics, as well as urine and excrement component. With a help of the IoT system, an equipment function monitoring, a replenishment of consumables, and a health and medical service can be obtained.

Referring to FIG. 1, the closestool type urine and excrement detection robot can be designed as a closestool-type, which can include an intelligent moving module 15, an interactive module 32, a height adjustment module 19, and a user identification module 28, a closestool structure module 13, a urine general identification detection module 11, a urine odor detection module 33, a urine component detection module 51, a excrement general identification detection module 14, a excrement odor detection module 25, a excrement component detection module 108, a cleaning flushing module, a waste treatment module 21, a wireless communication module 30, a central data processing module 24, a data security module, a battery charging module 20, and an equipment maintenance module.

The intelligent moving module 15 can be a four-wheel moving robot device arranged at a bottom of the closestool type urine and excrement detection robot, which includes a roller-skating mobile base installed with a plurality of driving wheel 18. The intelligent moving module 15 can be configured as an intelligent autonomous mobile carrier. By executing a route planning algorithm in a specific environment, based on a server and/or a user instruction, a detector 16 which comprises a visual sensor, a laser radar and a ultrasonic radar can perceive an immediate change information of a specific environment, avoid obstacles autonomously, re-optimize a moving route, and arrive at a scheduled service location with a help of GPS/Beidou navigation 17.

The intelligent moving module 15 can respond to a user need. After a route is planned, the closestool type urine and excrement detection robot can go to the user reserved location using the intelligent moving module 15 with a short-distance route, such as within a hospital, within a community or nearby a community. Although the route is short, a road condition is complex, such as with steps, ravines and/or rough road, the closestool type urine and excrement detection robot can go to the user reserved location with the intelligent moving module 15 being manually carried or assisted. When the route is long, the closestool type urine and excrement detection robot can take vehicles, such as a car, a plane, a drone, a rail transit, to provide a door-to-door service to reach the user reservation location, or entrust a third-party logistics system to deliver to the user reservation location.

In a possible design, the closestool type urine and excrement detection robot further comprises an interactive module 32 and a user identification module 28. The interactive module 32 can perform a human-machine interaction with a smart device, wherein the interactive module 32 can integrate multi-channel interaction methods, including a voice, a screen 31, an eyesight, an expression, an iris, a palm print, a handwriting, a gait, a gesture, a lip reading, a face, a DNA, and an ideas, as well as a mobile smart terminals123, a smart wearable device, an implanted sensing chips in body, and groupware above information fusion, meet a usage habit of different types of users and a communication standard of IoT system and equipment, and realize human-machine interaction, or machine-machine interaction between devices. Of course, the present invention gradually evolves through an intelligent training, can autonomously perceive a user need, and can complete urine and excrement detection without interacting with the user through human biological characteristics.

In a possible design, the closestool type urine and excrement detection robot can include an intelligent moving module 15 and a closestool structure module 13, wherein the closestool structure module can be arranged on an above of the intelligent moving module 15. The closestool structure module 13 comprises a urine pool 12 and a excrement pool 10. The intelligent moving module 15 is an intelligent autonomous mobile carrier, by executing a route planning algorithm and based on user instructions in a specific environment, can avoid obstacles autonomously, optimize the moving route, and reach a predetermined service position.

A urine and excrement detection part of the closestool type urine and excrement detection robot is arranged on the closestool structure module 13, which can connect with a central data processing module 24 by a signal. The urine and excrement detection part includes a urine general identification detection module 11, which is configured to collect the user urination behavior characteristic data and a general urine morphological characteristic data. The urine and excrement detection part includes a excrement general identification detection module 14, which can be configured to collect the user defecation behavior characteristic data, situation data around the anus and excrement morphological characteristic data. The urine and excrement detection part includes an odor detection module 33, which can be configured to collect a urine odor component data and a excrement odor component data. The urine and excrement detection part includes a urine component detection module 51, which can be configured to collect a urine component data. The urine and excrement detection part includes an excrement component detection module 108, which can be configured to collect excrement component data. In addition, the urine and excrement detection part can include an electronic weighing device 112, which can be configured to collect a weight data of excrement in a excrement pool 10.

Figure 3:
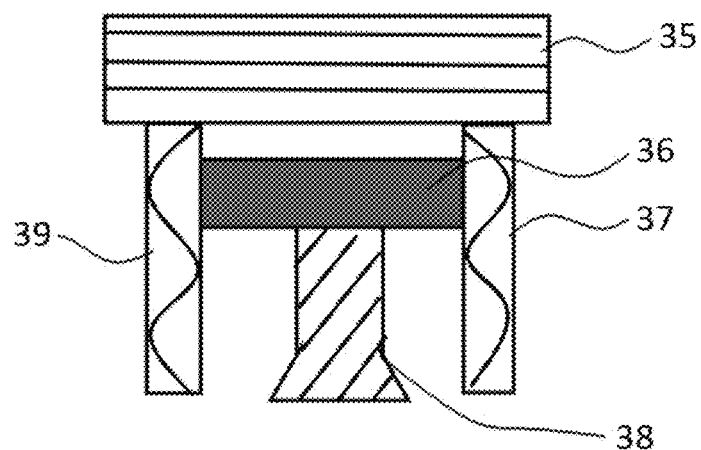
FIG. 3 is a schematic diagram of a height adjustment module adopted by a closestool type urine and excrement detection robot according to a preferred embodiment of the present invention.

In an embodiment, the side surface of the closestool structure module 13 can be provided with a support device with a base, the support device includes a plurality of support plates and a plurality of first intelligent controllable screw lifting devices 46. According to the user body height, body size and habits, with a help of human-machine interaction, height of the closestool type urine and excrement detection robot can be adjusted within a certain range, so that the user can comfortably squat or sit to urinate and defecate. As shown in FIG. 3, in a possible design, the base includes a height adjustment module 19 which includes a plurality of support plates 35, a lift drive motor, and a plurality of screw lifts controlled by the lift drive motor. The closestool structure module 13 is supported by a support plate 35 on a screw lifting device so as to be able to move up and down, and the lift drive motor is electrically connected to the base controller. The screw lifting device comprises a cross rod driving part 36, a right column 37, a left column 39, and a leg 38.

In an embodiment, the user identification module comprises a biometric identification and a paired device identification. The biometric identification can integrate a conventional face identification, a fingerprint identification, a voice identification, a gait recognition, and a DNA recognition. If a user chooses any of the above biometric identification, he or she can realize user biometric identification based on a biometric information at a time of registration. The paired device identification comprises a mobile smart terminal, a smart wearable device and a sensory chip implanted, which can be carried out by means of a wireless communication device according to a communication protocol.

It can be understood that, in a medical service institution, a user medical identification device, a dedicated two-dimensional code or barcode, or an instruction from a medical staff can also replace the user identification manner. In a family, a guardian can also complete identification in other ways instead of the user biometric identification, or complete the urine and excrement detection without going through the biometric identification. The biometric identification uses a blockchain technology for a real-name authentication. The user signs a smart contract, creates a personal private key and a personal public key, sends the personal public key, biometric information, and ID card information to a blockchain network, generates a block, and obtains a public key certificate chain, the user enters the biometric information, and the blockchain network verifies the user's identity by verifying a personal private key or a personal public key certificate chain.

Figure 4A:
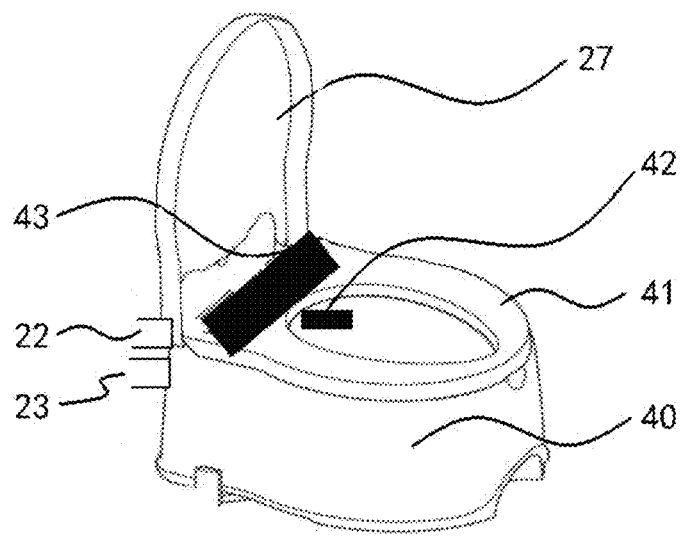
FIG. 4A is a schematic diagram of a closestool structure module adopted by a closestool type urine and excrement detection robot according to a preferred embodiment of the present invention.
Figure 4B:
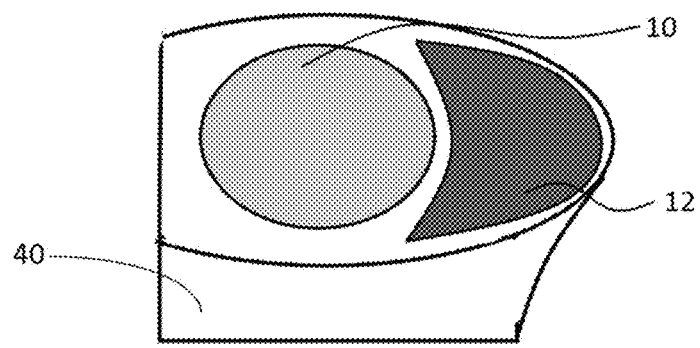
FIG. 4B is a schematic diagram of a closestool style of the closestool structure module adopted by a closestool type urine and excrement detection robot according to a preferred embodiment of the present invention.

Referring to FIG. 4A and FIG. 4B, in a possible design, the closestool structure module 13 can include a closestool for urine and excrement detection. The closestool for urine and excrement detection comprises a main body 40, a seat ring 41 installed on the main body 40, a cover plate, a backrest 27, a shower device 42, a water tank 43, a water inlet pipe 22 and a drainage pipe 23.

The main body 40 is provided with a closestool accommodating pool. A urine pool 12 is located in a front half of the closestool accommodating pool, with a scale line engraved on a wall of the urine pool 12. An excrement pool 10 is located in a rear half of the closestool accommodating pool.

Figure 2:
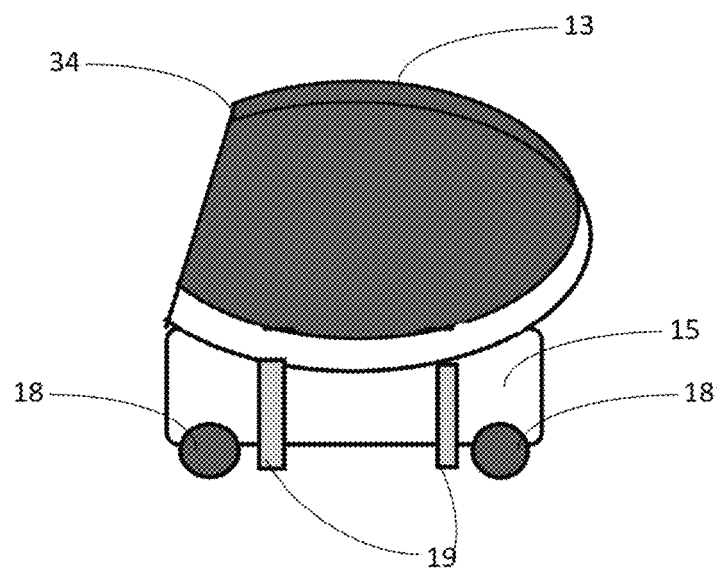
FIG. 2 is a schematic diagram of a stowable structure adopted by a closestool type urine and excrement detection robot according to a preferred embodiment of the present invention.

In an embodiment as shown in FIG. 2, the closestool structure module 13 is designed as a closestool-type structure disposing on an upper part of the intelligent moving module 15. The closestool structure module 13 comprises a main body 40, a seat ring 41, a cover plate, a backrest 27, a shower device 42, a water tank 43, a water inlet and a drainage pipe 23. As shown in FIG. 2 or FIG. 4A, the backrest 27 can be rotatably installed on an upper part of the main body 40 through a hinge 34 also being as a cover plate function.

Figure 6:
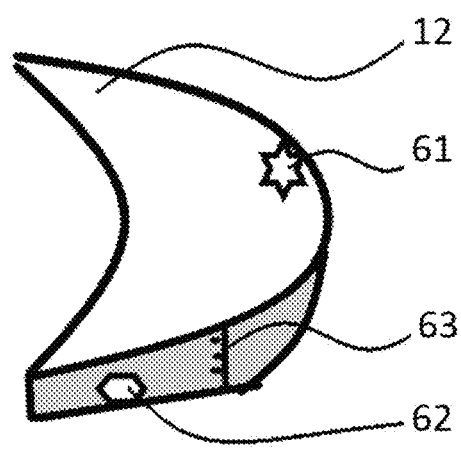
FIG. 6 is a schematic structural diagram of a urine general recognition detection module of a closestool type urine and excrement detection robot according to a preferred embodiment of the present invention.

In an embodiment, in order to make a structural design more reasonable, as shown in FIG. 4B, the accommodating pool of the main body 40 is divided into a urine pool 12 at a front and an excrement pool 10 at a middle and rear, which are configured to contain urine and excrement respectively. As shown in FIG. 6, a scale mark 63 is set on a wall of the urine pool 12 configured to record a dynamic change of urine volume, and a camera is arranged near a bottom of the urine pool 12. A screen 31, a deodorizing device 29, an odor detection module 33, a wireless communication module 30, a central data processing module 24, an interactive module, a user identification module 28, and a data security module are respectively arranged on the backrest 27.

Figure 5A:
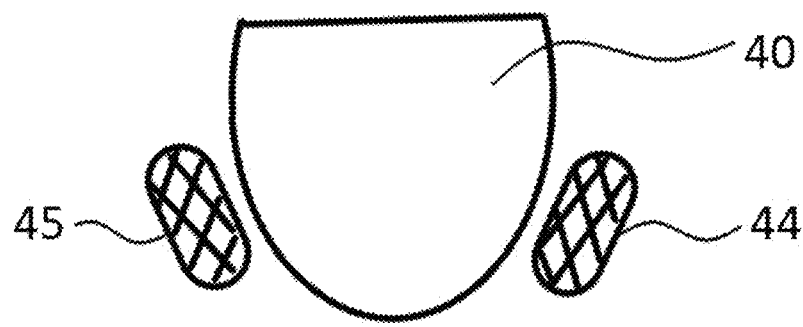
FIG. 5A is a schematic diagram of a squat style pedal adopted by a closestool type urine and excrement detection robot according to a preferred embodiment of the present invention.
Figure 5B:
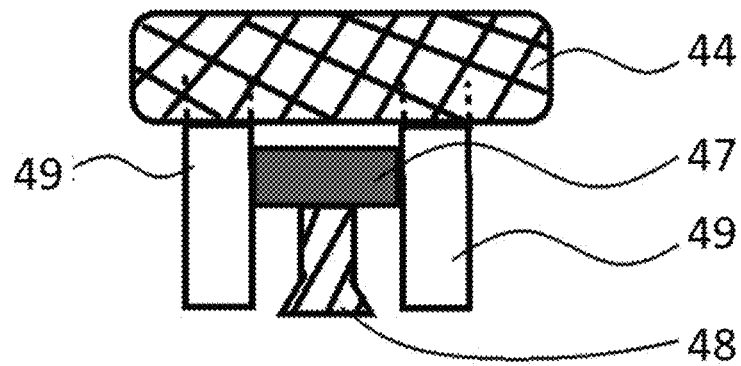
FIG. 5B is a schematic diagram of a screw lifting device of a squatting pedal adopted by a closestool type urine and excrement detection robot according to a preferred embodiment of the present invention.

In addition, as shown in FIG. 5A, a paired squatting pedal can be designed on both sides of a main body 40. The paired squatting pedal can be controlled by a screw lifting device to carry out a lifting movement. With the paired squatting pedal being raised and lowered, the user can adjust the height of the closestool type urine and excrement detection robot, and adopt a squatting closestool model or a closestool model. In a specific design, the squat closestool model is based on the closestool model with a set of foot pedals, including a left pedal 44 and a right pedal 45, which are arranged on both sides of the main body 40. With a help of a human-machine interaction, the height of the foot pedals can be adjusted by a second intelligent controllable lead screw lifting device 46 to realize the squat closestool model. The second intelligent controllable lead screw lifting device 46 comprises a support leg 48, a supporting column 49 and a driving part 47. Of course, when the user selects the closestool model, the second intelligent controllable lead screw lifting device 46 can also be activated to raise the foot pedals to an appropriate height to promote a smooth defecation and relieve constipation.

It can be understood that a shape, material, color and pattern of the closestool structure module can also be customized according to an individual needs. The closestool structure module can also add an armrest and/or other external equipment to further improve comfort.

In an embodiment, a general recognition module comprises a urine general recognition detection module 11 and a excrement general recognition detection module 14. As shown in FIG. 6, the urine general recognition detection module 11 can be arranged on a urine pool 12 at a front end of a closestool structure module. The urine general recognition detection module 11 comprises at least a LED light 61, at least a camera device 62 for collecting urine image data with an anti-reflection film for blocking a direct contact between the camera and urine, which can collect image and video data without dead angle. The image and video data can be released to a cloud server or a central data processing module 24 through a wireless communication module 30. A specific image and video data algorithm is configured to identify and analyze, measure a start and end time of a single urination, monitor speed of urine flow during urination, acceleration and changes in a shape of urine fluid continuously, monitor changes in urine volume and volume, urine color, urine turbidity, abnormal particles such as urinary calculi, and monitor a scale line of the urine pool 12, so as to obtain the user urination behavior characteristics and general morphological characteristics of urine.

Figure 7:
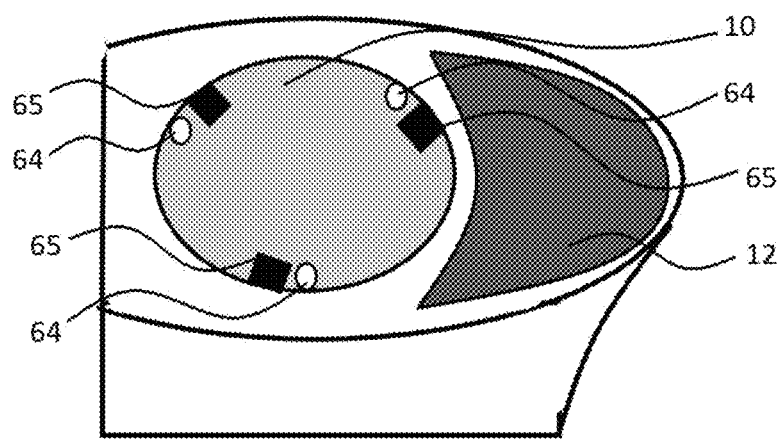
FIG. 7 is a schematic structural diagram of an excrement general recognition detection module of a closestool type urine and excrement detection robot according to a preferred embodiment of the present invention.

As shown in FIG. 7, according to an embodiment of the application the excrement general identification detection module 14 can be arranged on an upper part of the excrement pool 10, which comprises at least three LED lights 64 (LED light A, LED light B, LED light C) for providing illumination, and at least three cameras 65 (camera A, camera B, camera C) in a distributed configuration, so as to collect an image and video data without dead angle. The image and video data can be released to a cloud server or a central data processing module 24 through a wireless communication module 30, and a specific image and video data algorithm can be configured to identify and analyze, measure the defecation preparation, start and end time, and monitor continuously the speed and acceleration during the defecation process and excrement morphological changes, morphological changes around the anus during defecation, such as rectal prolapse, anal fissure, anal bleeding, hemorrhoids and morphological characteristics of hemorrhoids, excrement morphology, character, color data, monitor continuous excrement volume through three-dimensional image modeling changes, so as to obtain the user defecation behavior characteristics, a situation around a anus and a general morphological characteristics of excrement.

Preferably, the camera 65 can include a video digital optical microscope with an intelligent focus adjustment, a polarized light source, and a fluorescent excitation light source, which are configured to identify a parasite, egg, fresh or old blood, and exfoliated tissue piece in excrement, and fluorescently labeled components in urine and excrement.

Figure 8:
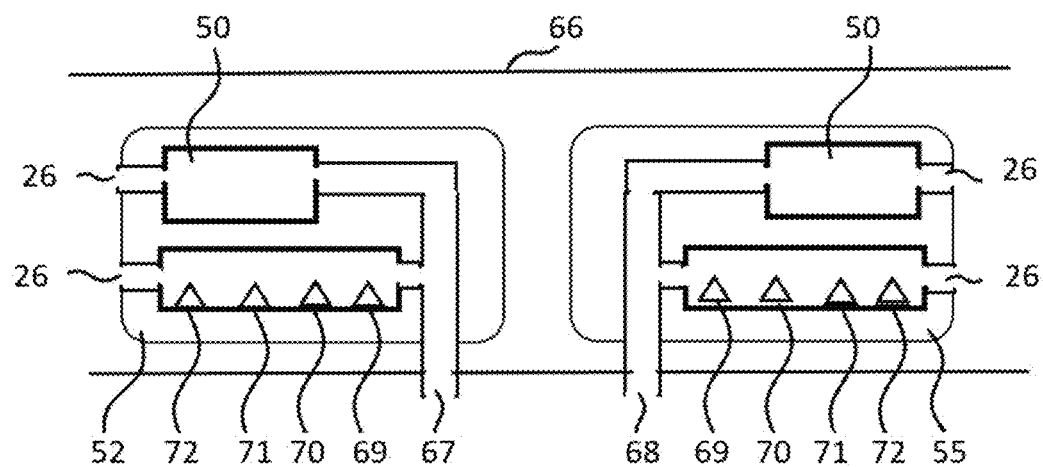
FIG. 8 is a schematic structural diagram of an odor detection module of a closestool type urine and excrement detection robot according to a preferred embodiment of the present invention.

Referring to FIG. 8, according to an embodiment of the application an odor detection module 33 comprises a urine gas path 67, an excrement gas path 68, a gas chromatograph 50, and an ionization deodorization device integrated in the module shell structure 66.

The urine gas path 67 can be correspondingly disposed above a side wall of a urine pool 12, which comprises a first gas collecting device, a first branch gas path and a second branch gas path communicating with an outlet of the first gas collecting device. The first branch gas path can be provided with an ammonia sensor 69, a hydrogen sulfide sensor 70, a polycyclic aromatic hydrocarbon sensor 71 and a volatile organic compound sensor 72. The second branch gas path can connect with a gas chromatograph 50 for detecting components in volatile gases of urine.

The excrement gas path 68 can be correspondingly disposed above a side wall of an excrement pool 10, which comprises a second gas collecting device, a third branch gas path and a fourth branch gas path communicating with an outlet of the second gas collecting device. The third branch gas path can be provided with an ammonia sensor 69, a hydrogen sulfide sensor 70, a polycyclic aromatic hydrocarbon sensor 71 and a volatile organic compound sensor 72. The fourth branch gas path can connect with a gas chromatograph 50 for detecting fecal volatile substances.

The exhaust gas of the urine gas path 67 and the excrement gas path 68 can be subjected to harmless treatment by an ionization deodorization device, then treated gas can be discharged through an exhaust gas outlet 26.

It can be understood that, in order to optimize a structure, the urine gas path 67 and the excrement gas path 68 can share a set of gas detection sensors and a gas chromatograph 50. After a urine odor detection is completed, the excrement gas path 68 is activated again to detect excrement odor component.

Referring to FIGS. 9A to 9D, according to an embodiment of the application a urine component detection module 51 comprise a urine sample diversion conduit, a urine test paper detection chamber 52, a urine flow analysis detection chamber 53, a urine detection chamber 53, and a gene detection chamber 54.

The urine test paper detection chamber 52 can include a urine test paper storage box, a urine test paper transmission device, a temperature control device, a urine sample tank, a urine test paper scanning camera, and a used test paper storage box.

The urine flow analysis detection chamber 53 can include a urine sample centrifugal concentration device, a urine sediment negative pressure sampling device, and a flow cytometry detection device.

The gene detection chamber structure 54 can include a gene chip storage box, a gene chip transmission device, a sample preparation device, a detection kit, a reagent adding device, a temperature control device, a gene chip hybridization reaction device, a signal detection device, and a used gene chip storage box.

Figure 9A:
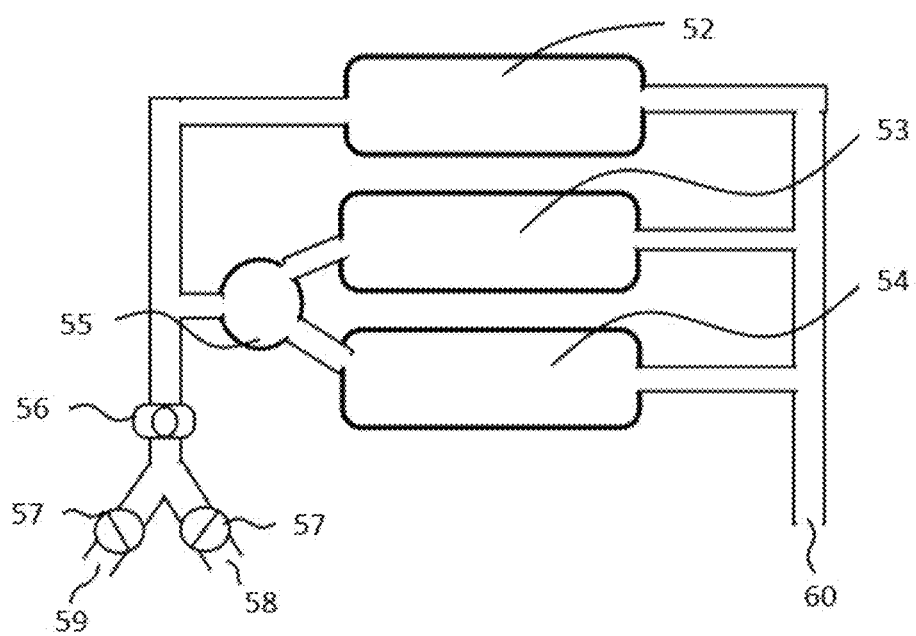
FIG. 9A is a schematic structural diagram of a urine component detection module of a closestool type urine and excrement detection robot according to a preferred embodiment of the present invention.

As shown in FIG. 9A, according to an embodiment of the application the urine component detection module 51 comprises a urine sample diversion conduit, a urine test strip detection chamber 52, a urine flow analysis detection chamber 53, a urine detection chamber 53, and a gene detection chamber 54. The urine sample diversion conduit starts from a bottom side wall of the urine pool 12. A urine sample passes through a urine inlet 58, a water inlet 59, a third electromagnetic valve 57, and a pump 56, then divides into three branch diversion pipelines, one of which is communicated with a urine test paper detection chamber 52, one of which is communicated with a urine flow analysis detection chamber 53, and one of which is communicated with a gene detection chamber 54, and then the urine sample flows out from a waste liquid outlet 60.

Figure 9B:
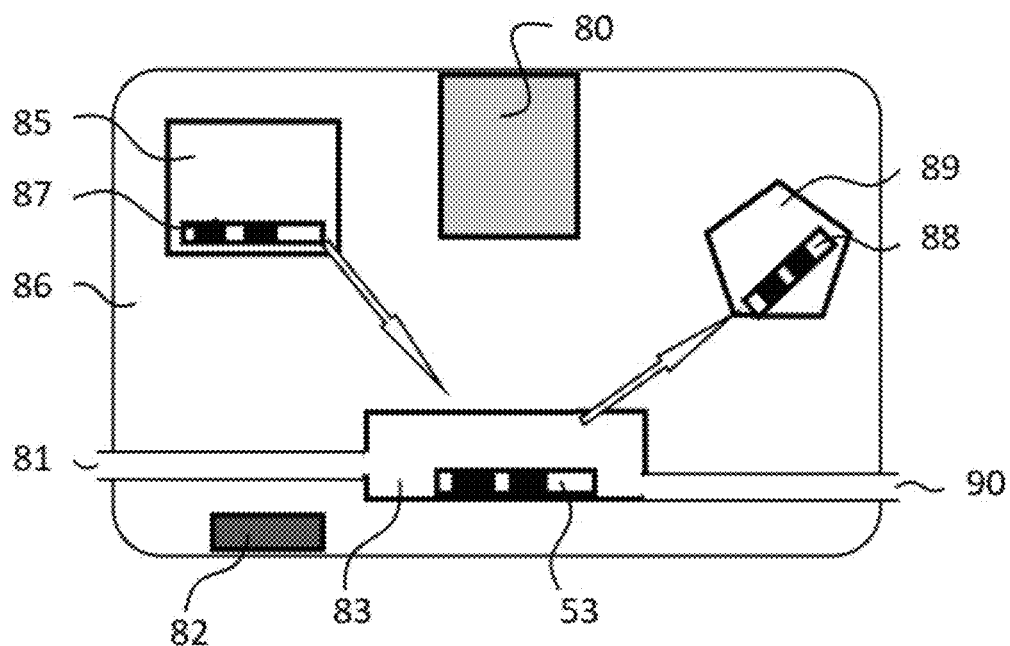
FIG. 9B is a schematic structural diagram of a urine test strip detection chamber of a closestool type urine and excrement detection robot according to a preferred embodiment of the present invention.

Specifically, as shown in FIG. 9B, according to an embodiment of the application a urine test paper detection chamber 52 comprises a urine test strip storage box 85, a urine test strip transmission device, a temperature control device 82, a urine sample tank 83, and a urine test strip image scanning device 80. When a detection starts, a urine sample enters a urine sample tank 83 through a diversion pipe liquid inlet 81, the temperature control device 82 is activated, and reaches an optimum temperature required for urine detection locally. A urine test paper 84 is ejected from a urine test paper storage box 85, the urine test paper 84 is moved into the urine sample tank 83 by the urine detection test strip transmission device in a urine detection chamber 86 to penetrate into the urine sample, then the urine test paper 84 is moved into the urine test paper image scanning device 80, and an image data of the urine test paper 84 is collected. Finally, a used test paper 88 is moved to a waste test paper storage box 89, and the urine sample flows out from a diversion pipeline liquid inlet 90.

Figure 9C:
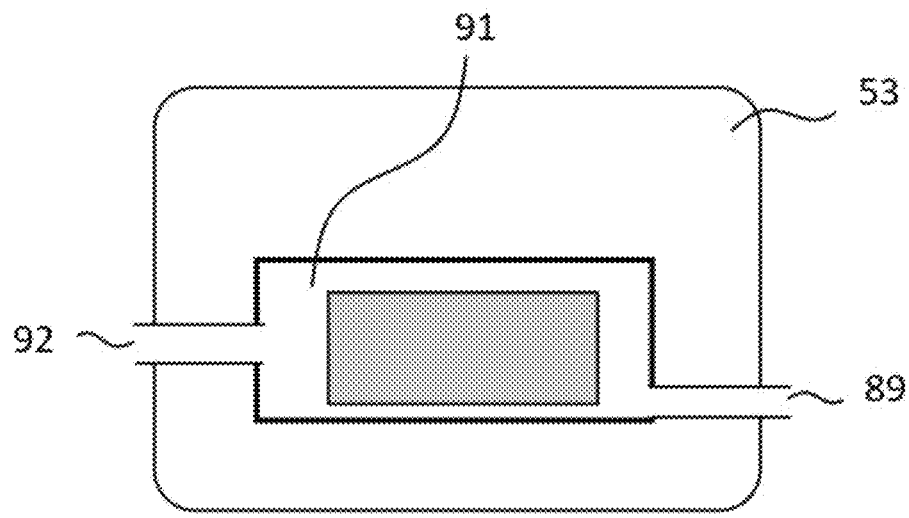
FIG. 9C is a schematic structural diagram of a urine flow analysis detection chamber of a closestool type urine and excrement detection robot according to a preferred embodiment of the present invention.

As shown in FIG. 9C, according to an embodiment of the application a urine flow analysis detection chamber 53 includes a flow analysis instrument 91, the flow analysis instrument 91 comprises a urine sample centrifugal concentration device, a urine sediment negative pressure sampling device, and a flow cytometry detection device. When the detection is started, a urine sample about 5 mL~20 mL enters the urine sample centrifugal concentration device through a diversion pipeline liquid inlet 92, then a concentrated urine sample can be drained to the flow cytometry detection device through a pipeline. a detection data is released to a cloud server or a central data processing module 24 through a wireless communication module 30. A specific image and video data algorithm can be configured for identification and analysis to classify and count a formed component in the urine sample. The formed component includes a red blood cell, a white blood cell, an epithelial cell, a tumor cell, a cast, a bacterium and a fungus. Finally, the urine sample flows out from a diversion pipe liquid outlet 93.

Figure 10:
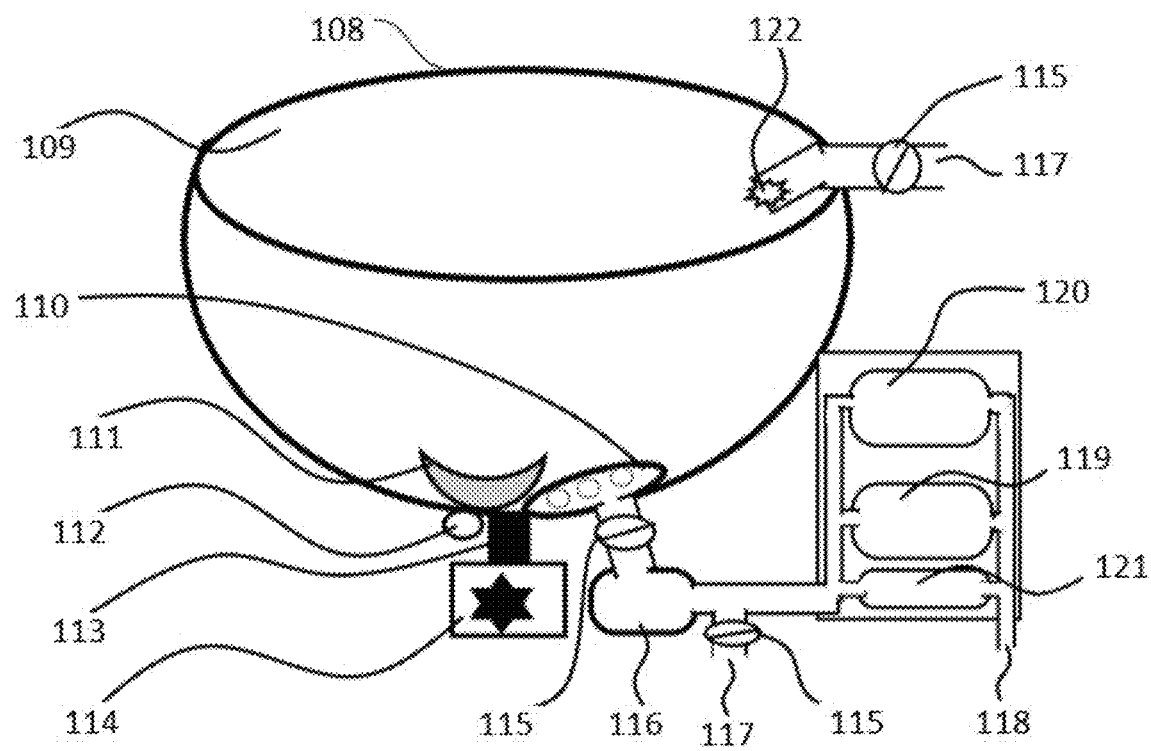
FIG. 10 is a schematic structural diagram of an excrement component detection module of a closestool type urine and excrement detection robot according to a preferred embodiment of the present invention.

Referring to FIG. 10, according to an embodiment of the application an excrement component detection module 108 can include an excrement container 109 which disposed in an excrement pool 10, an electronic weighing device 112, a connecting shaft 113, and a motor 114 which arranged at a lower part of the excrement container 109. A stirring device 111 can be arranged inside the excrement container 109, and a filter 110, an excrement filtrate storage tank 116, a second electromagnetic valve 115, an excrement filtrate drainage pipeline, a water inlet 117, and a waste liquid outlet 118 can be arranged at a bottom of the excrement container 109.

A space around the excrement container 109 can be provided with an excrement filtrate test strip detection chamber 119, an excrement filtrate gene detection chamber 120, an excrement filtrate flow analysis detection chamber 121, a water inlet pipe, and a first electromagnetic valve.

An excrement filtrate test strip detection chamber 119 comprises an excrement filtrate test paper storage box, an excrement filtrate test paper transmission device, a temperature control device, an excrement filtrate sample tank, and an excrement filtrate test paper image scanning device.

The excrement filtrate flow analysis detection chamber 121 comprises an excrement filtrate drainage pipeline and a flow cytometry detection device.

When a user defecates, the electronic weighing device 112 in a lower part of an excrement container 109 continuously detects weight of excrement. At a end of defecation, a first solenoid valve controls a water inlet pipe for diluting excrement. According to the total volume and morphological data of excrement, an amount of water sprayed on excrement by a shower device is determined through an algorithm, which including: more excrement, more amount of dilution water; judging from a shape of excrement, drier and harder excrement, more dilution water being added; on the contrary, thinner and/or soft excrement, less diluted water being added. When a water spray is over, a stirring device 111 starts. After a mixing is completed, a motor 114 starts to drive the excrement container 109 to rotate and centrifuge, and a fine component of the excrement sample enters an excrement filtrate storage tank 116 through a filter 110. The excrement filtrate in the excrement filtrate storage tank 116 enters an excrement filtrate drainage pipeline through a second electromagnetic valve 115 and a pump. The excrement filtrate drainage pipeline can be further divided into three branch drainage pipelines, one of which communicates with an excrement filtrate test strip detection chamber 119, one of which communicates with an excrement filtrate flow analysis detection chamber 121, and one of which communicates with an excrement filtrate gene detection chamber 120.

When an excrement filtrate detection starts, an excrement filtrate enters an excrement filtrate test trip detection chamber 119 through a branch drainage pipeline, a temperature control device 82 is activated, and reaches an optimal temperature required for the excrement filtrate detection, an excrement filtrate test paper is ejected from an excrement filtrate test paper storage box and moved into an excrement filtrate storage tank 116 through an excrement filtrate detection paper transmission device, and invaded into the excrement filtrate. Then, the excrement filtrate test paper is moved into an excrement filtrate detection paper scanning device through the excrement filtrate detection paper transmission device, and an image data of the excrement filtrate test paper is collected. The excrement filtrate enters an excrement filtrate flow analysis detection chamber 121 through another branch drainage pipeline. A flow cytometry detection device collects data on a formed component of the excrement filtrate, then a data is released to a cloud server or a central data processing module 24 through a wireless communication module 30, which uses a specific image and video data algorithm to identify and analyze a formed component in the fecal filtrate, including a red blood cell, a white blood cell, a tumor cell, a bacterium, and a fungus.

Figure 9D:
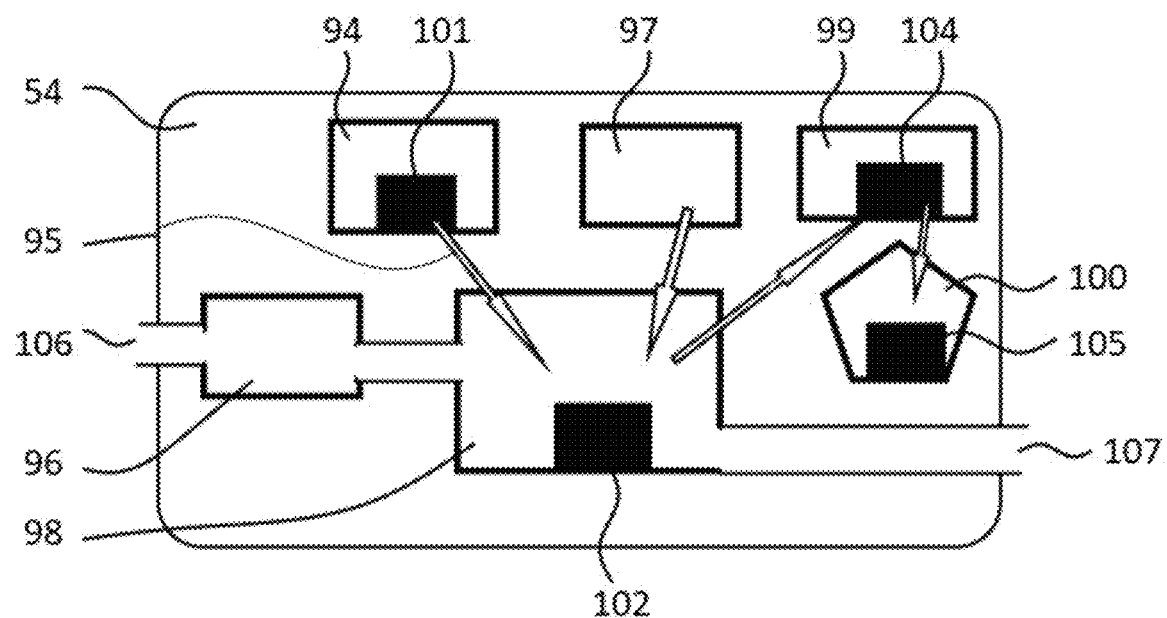
FIG. 9D is a schematic structural diagram of a gene detection chamber structure of a closestool type urine and excrement detection robot according to a preferred embodiment of the present invention.

Referring to FIG. 9D, according to an embodiment of the application a gene detection chamber 54 for urine and excrement filtrate comprises a gene chip storage box 94, a gene chip transfer device 95, a sample centrifugal concentrating device, a sample preparation device 96, a detection kit 97, a detection reagent adding sample device, a temperature control device, a gene chip hybridization reaction device 98, a signal detection device 99, and a used gene chip storage box 100. During a detection, urine or excrement filtrate passes through the centrifugal concentrating device through the gene detection chamber 54 liquid inlet 106, then a concentrated sample enters the sample preparation device 96 for labeling, and then enters the gene chip hybridization reaction device 98, where it hybridizes with a gene chip under a specific condition. A gene chip 101 is transferred to the gene chip hybridization reaction device 98. After an in-reaction chip 102 is eluted, the in-reaction chip 102 is transferred to the signal detection device 99 to become an in-detection chip 103 which is scanned. A used chip 105 is transferred to the used gene chip storage box 100. Finally, a waste liquid flows out from the gene detection chamber 54 liquid outlet 107. In addition to a tumor cell, a circulating tumor cell DNA, and a circulating RNA, the gene chip detection items also include a bacterial, fungal, and viral DNA and RNA in the urine or excrement filtrate.

A central data processing module 24 comprises a data storage module and a data processing module, which performs a data processing on a detection data sent by a urine and/or excrement detection device, and transmits a processed data to the data storage module and a cloud server respectively. In an embodiment of the present invention, the data processing device includes an NPU, a CPU, and a GPU, which collects data such as a urination behavior data, a defecation behavior data, a urine and excrement general data, an odor detection data, a test strip detection data, a flow analysis detection data, a gene chip scanning data, compares the data with a reference range of a normal index value of a population and a value of the user previous detection, statistical analysis, combines with the user living habits, family history of diseases, past disease history, symptoms, other test results, and a third-party intelligent medical system or an artificial medical system, so as to evaluate health of the user urinary system, digestive system, and other systems, and provide a basis for medical decision-making.

The user identification module 28 comprises a biometric identification module and a paired device identification module. The biometric identification module includes at least one of a face identification module, a fingerprint identification module, a voice identification module, a gait identification module, a DNA identification module, and an IC card identification module. The paired device identification module includes at least one of a pairing identification of an intelligent terminal, an intelligent wearable device, and an in-vivo perception chip.

An IoT system for the closestool type urine and excrement detection robot comprises a closestool type urine and excrement detection robot, a plurality of smart mobile terminals 123, a cloud server 124, an emergency management support system 125, a medical support system 127, a logistics system 128, an intelligent access control 126, and a nursing robot 129. A user makes an appointment to order a urine and/or excrement testing services through the smart mobile terminal 123 application. With a help of the logistics system 128, the closestool type urine and excrement detection robot can enter a ward or the user residence through an intelligent access control permission. With a guidance and assistance of the nursing robot 129, the closestool type urine and excrement detection robot can arrive at a predetermined service location. A data collected during a detection process is sent to the cloud server 124, then the emergency management support system 125 can monitor a working condition of the closestool type urine and excrement detection robot at any time, and the medical support system 127 provides the user with a diagnosis and treatment advice.

The data security module can create a user data center through a blockchain technology to store and distribute a user data. The user data, connected IoT data, public cloud or private cloud connection can be completely based on a blockchain smart contract authorized by the user, and the user data written to a blockchain in real time is released to a public cloud or a private cloud after a user authorization. The blockchain is configured to realize a security isolation of user data, and a third-party user can be authorized to read the user data.

According to an embodiment of the application, the closestool type urine and excrement detection robot further comprises a cleaning flushing module and a waste treatment module 21.

The cleaning flushing module comprises a water inlet pipe 22, a pump, a third electromagnetic valve 57, a pipe connecting the urine pool 12, a pipe connecting the excrement pool 10, a pipe connecting the urine component detection module 51, and a pipe connecting the excrement component detection module, and a drainage pipe 23.

At an end of a detection operation, a third electromagnetic valve 57 is opened, and a pump configured in a water inlet pipe 22 passes clean water through pipes to flush the urine pool 12, and the excrement pool 10, as well as the diversion pipe and test paper detection cavity of the urine and excrement detection chamber, the flow analysis detection chamber, and the gene detection chamber. Finally, a wastewater drained by a pumped flows into a hospital or household sewage system.

The waste treatment module 21 comprises an odor treatment device 29, a used test paper storage box 89, and a used gene chip storage box 100. The odor of urine and excrement and waste gas generated during a detection process can be collected and converted into odor-free gas by the odor treatment device 29. After collection, a used test papers and/or used gene chip can be incinerated and disposed of harmlessly according to a conventional medical waste.

Specifically, a technical processing of the above data includes two solutions: (1) upload the data to a public cloud server, then the public cloud server provides data computing, analysis, and decision-making services, and all data is published to a public chain and sent to the user at the same time; (2) based on local data processing capabilities, the data processing devices such as CPU, GPU, and NPU, provide computing, analysis, and decision-making services, then all data are released to an industry private chain of a private cloud server, and sent to the user through a wireless or wired transmission.

According to an embodiment of the application, the closestool type urine and excrement detection robot further comprises a wireless communication module 30, a data security module, a battery charging module 20, and an equipment maintenance module.

The equipment maintenance module comprises an equipment fault self-inspection system, a fault self-repair system, a fault information sending server, a monitoring system of remaining consumables, and a battery power monitoring system. If the closestool type urine and excrement detection robot fails, first of all, the closestool type urine and excrement detection robot repairs itself. If the repair fails, the failure information is sent to a server. In addition, a spared closestool type urine and excrement detection robot is dispatched to provide services for the user, and the faulty closestool-type urine excrement robot is returned to a service center for further maintenance. If the remaining amounts of consumables and insufficient battery power are detected, the closestool type urine and excrement detection robot can be prompted to replenish the consumables and recharge in time.

In order to expand the future needs of the closestool type urine and excrement detection robot, at least one expansion slot is reserved in the urine detection module and the excrement detection module. The expansion slot comprises a circuit, a water circuit, a gas circuit, a sample transmission channel, a data link connection interface, and a space configured to add a functional module.

In addition, according to the user requirements, the functional module of the closestool type urine and excrement detection robot can be combined as needed, and working states of some functional modules can also be turned off or turned on, such as:

According to the user requirements, the user can select or combine the odor detection module 33, the urine general identification detection module, the urine component detection module, the excrement general identification detection module and the excrement component detection module through the interactive module to meet the user detection needs.

Figure 12:
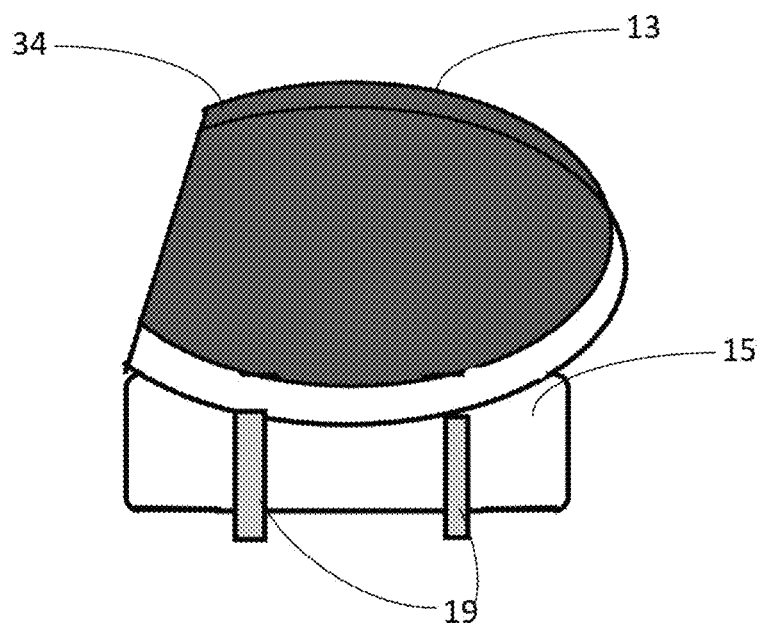
FIG. 12 is a schematic structural diagram of a closestool type urine and excrement detection robot without an intelligent moving module according to a preferred embodiment of the present invention.

Or, as shown in FIG. 12, the closestool type urine and excrement detection robot can also directly use other functional modules without setting the intelligent moving module 15, and can also complete the detection of urine and/or excrement.

Figure 13:
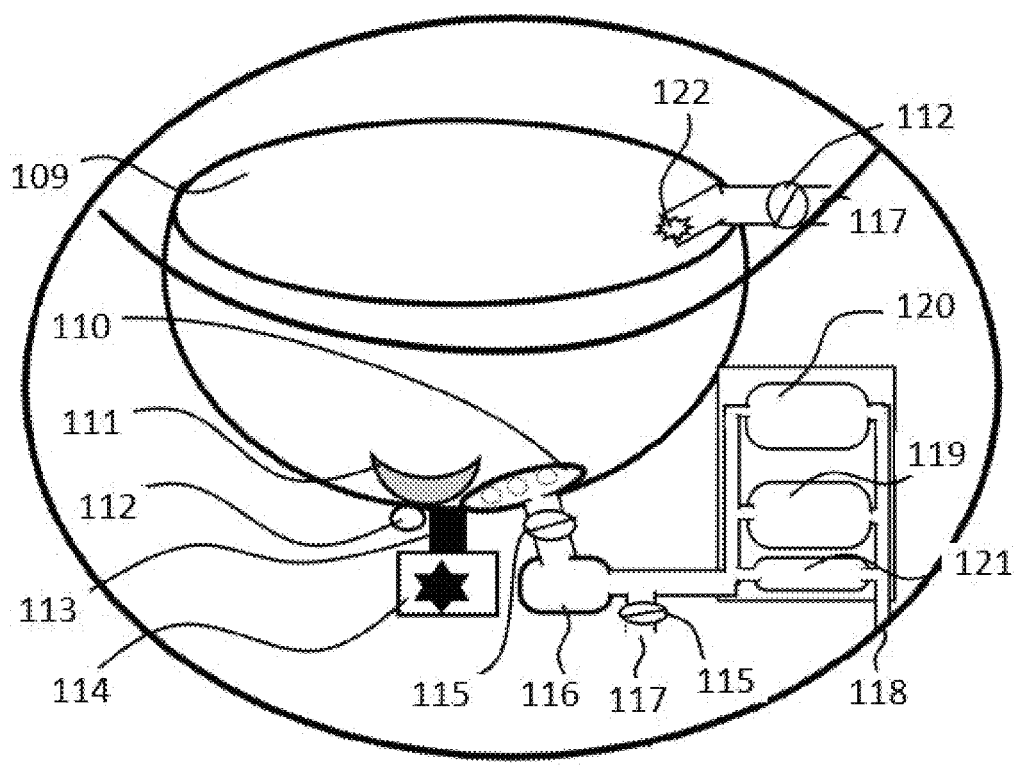
FIG. 13 is a schematic structural diagram of a closestool type urine and excrement detection robot without an intelligent moving module and a closestool structure module according to a preferred embodiment of the present invention.

Or, as shown in FIG. 13, the closestool type urine and excrement detection robot can be neither equipped with an intelligent moving module 15 nor a closestool structure module. The closestool type urine and excrement detection robot with an interactive module, a user identification module 28, a urine general identification detection module 11, a urine odor detection module 33, a urine component detection module 51, a excrement general identification detection module 14, a excrement odor detection module, a excrement component detection module 55, a cleaning flushing module, a waste treatment module 21, a wireless communication module 30, a central data processing module 24, a data security module, a battery charging module 20, and an equipment maintenance module can be placed in a pool of a conventional closestool by properly adjusting an external structure or connecting parts for urine and/or excrement detection.

Even, the interactive module, the user identification module 28, the general urine identification detection module 11, the urine odor detection module 33, the urine component detection module 51, the excrement general identification detection module 14, the excrement component detection module 55, the cleaning flushing module, the waste treatment module 21, the wireless communication module 30, the central data processing module 24, the data security module, and the battery charging module 20 are further miniaturized or functionally simplified, and become a portable handheld closestool type urine and excrement detection robot, which can be combined with a conventional closestools to implement urine and/or excrement detection.

Of course, the urine component detection module 51 and the excrement component detection module 52 can also share a set of test paper detection chamber, flow analysis detection chamber, and gene detection chamber, which further can simplify and reduce a size of the portable handheld closestool type urine and excrement detection robot, and makes it more portable.

It can be understood that the closestool type urine excrement detection robot can be provided without the intelligent moving module 15, and/or the closestool structure module, which can be directly placed in a pool of a conventional closestool for urine and excrement detection. The urine excrement detection robot can retain the urine component detection module and the excrement component detection module only, and be made into a portable handheld device, which is used in combination with a conventional closestool to perform urine and excrement component detection. The urine composition detection module and the excrement component detection module can share the test paper detection chamber, the flow analysis detection chamber, and the gene detection chamber to further simplify and reduce the size of the portable handheld device.

Figure 11:
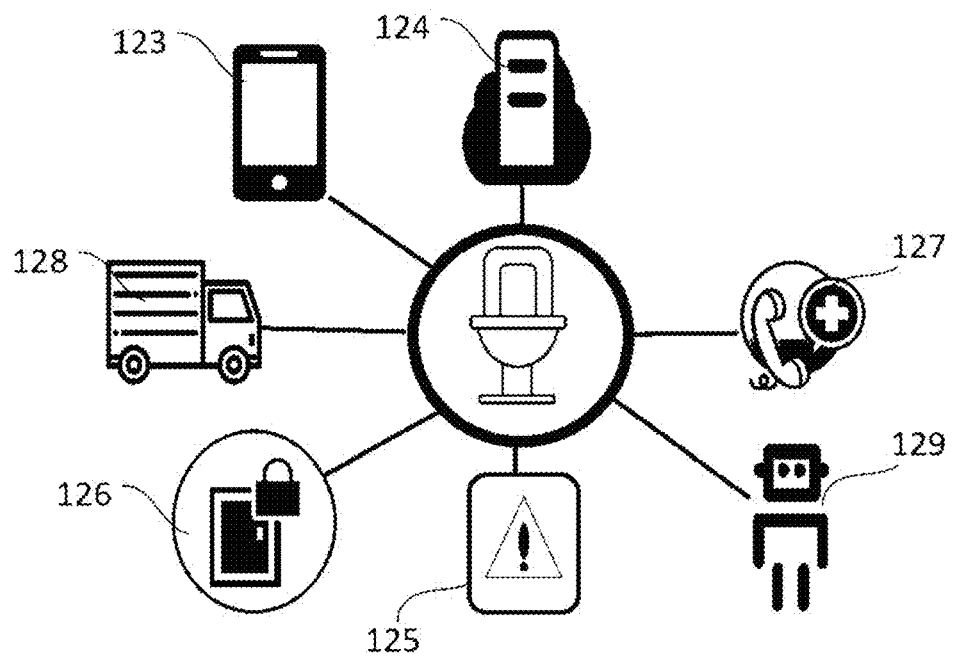
FIG. 11 is a schematic diagram of an IoT system of a closestool type urine and excrement detection robot according to a preferred embodiment of the present invention.

The present invention also provides an IoT system for the closestool type urine and excrement detection robot. As shown in FIG. 11, the IoT system includes the above-mentioned urine excrement detection robot and an IoT system suitable for the closestool type urine excrement detection robot.

Based on above, a process of the IoT system for a closestool type urine and excrement detection robot provided by a preferred embodiment of the present invention comprises a plurality of steps as follow.

(a) the closestool type urine and excrement detection robot receives requirements submitted by a user, including an appointment time and usage time, a service location, a service item, and fee.

(b) according to the planned route and delivery method, the closestool type urine and excrement detection robot arrives at a predetermined service location. Among them, the planned route and delivery method refers to, after responding to the user requirements, the closestool type urine and excrement detection robot goes to the user reserved location by itself, or the closestool type urine and excrement detection robot takes vehicles, including but not limited to a car, a plane, a drone, a door-to-door service, a rail transit, or delivered by a third-party logistics system. Then connect a circuit, waterway and network with the closestool type urine and excrement detection robot.

(c) the closestool type urine and excrement detection robot completes user identification based on a biometrics or paired device.

(d) after the user chooses a squatting or sitting closestool model, adjust the closestool type urine and excrement detection robot to a suitable height for the user according to user habits.

(e) the closestool type urine and excrement detection robot receives user urination and/or defecation.

(f) the closestool type urine and excrement detection robot monitors the user urination and/or defecation behavioral.

(g) the closestool type urine and excrement detection robot detects the user urine and/or fees odor components.

(h) the closestool type urine and excrement detection robot detects the user urine and/or excrement general indicators.

(i) the closestool type urine and excrement detection robot detects the user urine and/or excrement component.

(j) the closestool type urine and excrement detection robot completes the detection.

(k) the closestool type urine and excrement detection robot starts a flushing disinfection device, an odor treatment device, and disinfection device.

(l) the closestool type urine and excrement detection robot ends a single detection.

(m) the closestool type urine and excrement detection robot performs multiple tests as needed.

(n) the closestool type urine and excrement detection robot sends an encrypted data on urination and/or defecation behavioral characteristics, odor components, general indicators, and urine and/or excrement components to a cloud server.

(o) the cloud server provides a detection report, a health and medical advice to the user.

(p) the closestool type urine and excrement detection robot leaves the user for a next based on demand.

In addition, based on the user needs, the user can choose and combine the odor detection module, the general urine identification detection module, the urine component detection module, the general excrement identification detection module and the excrement component detection module through an interactive module in order to realize the user personalized detection needs.

The above are preferred embodiments of the present invention that the objects of the present invention have been fully and effectively accomplished. The embodiments have been shown and described for a purpose of illustrating functional and structural principles of the present invention and is subject to change without departure from such principles. Therefore, this invention includes all modifications encompassed within a spirit and scope of the following claims.

What is claimed is:

1. A closestool type urine and excrement detection robot, comprising an intelligent moving module, an interactive module, a height adjustment module, a user identification module, a closestool structure module, a urine general recognition detection module, an odor detection module, a urine component detection module, a excrement general recognition detection module, a excrement component detection module, a cleaning flushing module, a waste treatment module, a wireless communication module, a central data processing module, a data security module, a battery charging module, and an equipment maintenance module, wherein the intelligent moving module is a four-wheeled robot device arranged at a bottom of the closestool structure module, as an intelligent autonomous mobile carrier, which can autonomously avoid obstacles and optimize a moving route in a specific environment to scheduled service location by executing a route planning algorithm and based on a user instruction;

wherein the interactive module integrates multi-channel interaction modes, and the interaction modes include at least one of a voice, a touch screen, an eyesight, an expression, an iris, a palm print, a handwriting, a gait, a gesture, a lip reading, a human face, a DNA, and an idea, and the interactive module is configured for information fusion with a mobile smart terminal, a smart wearable device, an implanted sensing chip in body, and groupware information to realize a human-machine interaction and inter-device interaction;

wherein the height adjustment module includes a base support device arranged on ae side surface of the closestool structure module, a plurality of support plates, and a base support leg composed of a plurality of first intelligent controllable screw lifting devices;

wherein the user identification module includes a biometric identification module and a pairing device identification module, the biometric identification module includes at least one of a face identification module, a fingerprint identification module, a voice identification module, a gait identification module, a DNA identification module, and an IC card identification module, the pairing device identification modules includes at least one of an intelligent terminal, an intelligent wearable device, and an in vivo perception chip implanted;

wherein the closestool structure module is arranged on an upper part of the intelligent moving module, which includes a main body, a seat ring, a cover plate, a backrest, a shower device, a water tank, a water inlet pipe, and a drainage pipe, the main body includes a urine pool at the front and a excrement pool at the middle and rear respectively configured to hold urine and excrement, and a screen, a deodorizer, an odor detection module, a wireless communication module, a central data processing module, an interactive module, a user identification module, and a data security module are arranged on the backrest, the closestool structure module adopts two types of squat closestool and closestool, the squat closestool system is based on the closestool system and adds a set of foot pedals which are arranged on both sides of the main body to adjust a height of the foot pedal through a second intelligent controllable screw lifting device to realize the squat closestool;

wherein the urine general identification detection module is arranged on the urine pool which includes at least one light-emitting diode (LED) light for providing illumination, at least one camera for collecting urine image data configured to combine a image and video data analysis algorithm to obtain a single urination time course, urodynamic characteristics, and urine volume, color, and turbidity data;

wherein the excrement general identification detection module is provided on the excrement pool which includes at least three LED lights for providing illumination and at least three cameras for collecting excrement image data configured to obtain a data of defecation time course, defecation dynamic characteristics, morphological changes around the anus during defecation, and excrement volume, shape and color;

wherein the odor detection module includes a urine gas path and a excrement gas path for detecting volatile organic compounds, ammonia, and hydrogen sulfide with a plurality of gas detection sensors, gas chromatograph and ionization deodorization device;

wherein the urine component detection module includes a urine sample diversion pipeline, a urine test paper detection chamber, a urine flow analysis detection chamber, and a urine gene detection chamber, wherein the urine test paper detection chamber includes a urine test paper storage box, a urine test paper transmission device, a temperature control device, a urine sample tank, a urine test paper scanning device, and a used test paper storage box, wherein the urine flow analysis detection chamber includes a urine sample centrifugal concentration device, a urine sediment negative pressure device, and a urine flow cytometry detection device, wherein the gene detection chamber includes a gene chip storage box, a gene chip transmission device, a sample preparation device, a detection kit, and a reagent sample adding device, a temperature control device, a gene chip hybridization reaction device, a signal detection device, and a used gene chip storage box;

wherein the excrement component detection module includes a excrement container arranged in the excrement pool, an electronic weighing device, a connecting shaft and a motor arranged in an lower part of the excrement container, a mixing stirring device is arranged in the excrement container which includes a filter, a excrement filtrate storage tank, a second electromagnetic valve, and a excrement filtrate drainage pipeline arranged at a bottom, and a excrement filtrate test strip detection chamber, a excrement filtrate gene detection chamber, and a excrement filtrate flow analysis detection chamber arranged in surrounding space of the excrement container;

wherein the cleaning flushing module includes a water inlet pipeline, a pump, a third electromagnetic valve, a pipeline connecting the urine pool, a pipeline connecting the excrement pool, a pipeline connecting the urine component detection module, a pipeline connecting the excrement component detection module, and a drain pipe;

wherein the waste treatment module includes an odor treatment device, a used test paper storage box, and a used gene chip storage box;

wherein the central data processing module includes a data storage device and a data processing device, wherein the data processing device performs technical processing on a collected data to compare the collected data with a normal reference value of a population and a value detected by the user in past, combining with the user living habits, family history of diseases, and past disease history, symptoms, to evaluate a health status of the user urinary system and digestive system, and provide a medical decision-making;

wherein the data security module creates a user data center through blockchain technology to store and distribute user data which is published to a blockchain of a public cloud or private cloud with an authorization of the user, to realize a security isolation of user data; and wherein the equipment maintenance module includes an equipment fault self-checking system, a fault self-repairing system, a fault information sending system, and a monitoring device for the remaining quantity of consumables.

2. The closestool type urine and excrement detection robot according to claim 1, wherein the user identity recognition module uses a blockchain technology for real-name authentication, the user signs a smart contract, creates a personal private key and a personal public key, the user inputs a biometric identification information, and the blockchain verifies through a verification of the public key certificate chain.

3. The closestool type urine and excrement detection robot according to claim 1, wherein the camera is provided with a video digital optical microscope with intelligent focus adjustment, a polarized light source, and a fluorescent excitation light source configured to obtain image data of a parasite, an egg, a blood, and an exfoliated tissue.

4. The closestool type urine and excrement detection robot according to claim 1, wherein the urine odor detection module and excrement odor detection module share a set of gas detection sensors and gas chromatograph; the odor detection module performs detection, the urine gas path is first activated to detect urine odor component, and then the excrement gas path is activated to detect excrement odor component.

5. The closestool type urine and excrement detection robot according to claim 1, wherein the excrement filtrate gene detection chamber is configured to detect a tumor cell DNA, a circulating tumor cell DNA, a circulating tumor cell RNA, a tumor cell exosome, a protein marker, and a bacterial, fungal, and viral DNA and RNA.

6. The closestool type urine and excrement detection robot according to claim 1, wherein the first electromagnetic valve is configured to control a water inlet pipe for diluting excrement, and according to a total volume and morphological data of excrement, an amount of water to be added is determined through a preset algorithm.

7. The closestool type urine and excrement detection robot according to claim 1, wherein the closestool structure module be customized according to user needs; and wherein the main body has a handrail.

8. The closestool type urine and excrement detection robot according to claim 1, wherein the urine component detection module and the excrement component detection module have at least one expansion slot which includes an electric circuit, a water circuit, an air circuit, a sample transmission channel, a data interface, and a space.

9. The closestool type urine and excrement detection robot according to claim 1, wherein the intelligent moving module is a detachable structure, so that the closestool type urine and excrement detection robot removes the intelligent moving module, become a portable closestool type urine and excrement detection robot.

10. The closestool type urine and excrement detection robot according to claim 9, wherein the portable closestool type urine and excrement detection robot is directly placed into a pool of a conventional closestool for urine and excrement detection.

11. The closestool type urine and excrement detection robot according to claim 9, wherein the portable closestool type urine and excrement detection robot retains only the urine component detection module and/or the excrement component detection module, so as to be made into a portable handheld device, and used in combination with a conventional closestool to perform urine and/or excrement component detection.

12. The closestool type urine and excrement detection robot according to claim 9, wherein the urine component detection module and the excrement component detection module share a test paper detection chamber, a flow analysis detection chamber, and a gene detection chamber configured to simplify and reduce a size of the portable closestool type urine and excrement detection robot.

13. An Internet of Things (IoT) system for a closestool type urine and excrement detection robot, comprising:
a closestool type urine and excrement detection robot, a mobile intelligent terminal, a cloud server, an emergency support system, a medical support system, a logistics system, an intelligent access control, and a nursing robot,
wherein the IoT system for the closestool type urine and excrement detection robot works as follow: (a) a user submitting a demand which includes an appointment time and a length of use time, a service location, and a service item, and prepaying fee; (b) according to a planned route and delivery method, the closestool type urine and excrement detection robot arriving at the service location; (c) connecting a circuit, water, air and network; (d) user identification; (e) the closestool type urine and excrement detection robot adjusting to an appropriate height; (f) the user urination and defecation; (g) the closestool type urine and excrement detection robot monitoring of urination and defecation behavioral characteristics; (h) the closestool type urine and excrement detection robot detecting urine and/or fecal odor components; (i) the closestool type urine and excrement detection robot detecting urine and/or excrement general indicators; (j) the closestool type urine and excrement detection robot detecting urine and/or excrement component indicators; (k) testing completed; (l) flushing and disinfection device; (m) ending a single test; (n) completing multiple tests as needed; (o) the closestool type urine and excrement detection robot encrypting and storing a data of urination and defecation behavioral characteristics, odor components, general indicators and component indicators, and sending to a cloud server; (p) the user obtaining a report and a health and medical advice; (q) the closestool type urine and excrement detection robot leaving the user for a next user based on needs.

14. The IoT system for the closestool type urine and excrement detection robot according to claim 13, wherein the planned route and delivery method includes (a) going to the service location by itself, (b) taking a vehicle which includes but not limited to a car, a plane, a drone and/or a rail transit, and arrive at the service location, (c) sending by a third-party logistics system.

15. The IoT system for the closestool type urine and excrement detection robot according to claim 13, wherein the closestool type urine and excrement detection robot selects and combines an odor detection module, a urine general identification detection module, a urine component detection module, a excrement general identification detection module and a excrement component detection module according to the user needs through an interactive module to realize the user personalized detection requirements.

* * * * *